(12) United States Patent
Hurst, Jr. et al.

(10) Patent No.: US 6,580,829 B1
(45) Date of Patent: Jun. 17, 2003

(54) DETECTING AND CODING FLASH FRAMES IN VIDEO DATA

(75) Inventors: Robert Norman Hurst, Jr., Hopewell, NJ (US); Jungwoo Lee, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/282,123

(22) Filed: Mar. 31, 1999

Related U.S. Application Data

(60) Provisional application No. 60/101,701, filed on Sep. 25, 1998.

(51) Int. Cl.[7] .............................................. G06K 9/36
(52) U.S. Cl. ..................... 382/236; 382/278; 348/456; 375/240.13
(58) Field of Search ................. 382/236, 238, 382/239, 278; 375/240.02, 240.12, 240.13, 240.15, 261, 241.2, 240.3; 348/456, 445, 526, 556, 555, 558, 441, 571, 714, 716

(56) References Cited

U.S. PATENT DOCUMENTS

| | | | | |
|---|---|---|---|---|
| 5,471,176 A | * | 11/1995 | Henson et al. ................ 331/57 |
| 5,654,751 A | * | 8/1997 | Richard, III ................ 348/192 |
| 5,708,767 A | * | 1/1998 | Yeo et al. ................... 345/440 |
| 5,774,593 A | * | 6/1998 | Zick et al. .................. 382/235 |
| 5,801,765 A | * | 9/1998 | Gotoh et al. ............... 348/155 |
| 5,831,616 A | * | 11/1998 | Lee ............................. 345/861 |
| 5,911,008 A | * | 6/1999 | Niikura et al. .............. 382/236 |
| 5,920,518 A | * | 7/1999 | Harrison et al. ............ 365/233 |
| 5,987,179 A | * | 11/1999 | Riek et al. .................. 382/236 |
| 6,014,694 A | * | 1/2000 | Aharoni et al. ............. 709/219 |
| 6,078,693 A | * | 6/2000 | Kawamura et al. ......... 382/238 |
| 6,240,103 B1 | * | 5/2001 | Schoenblum et al. ....... 348/423 |

OTHER PUBLICATIONS

Yukinobu Taniguchi " Panorama Excerpts: extracting anfd packing panoramas for video browsing ", ACM p. 427–436, Year Publication 1997.*

* cited by examiner

*Primary Examiner*—Bhavesh M. Mehta
*Assistant Examiner*—Sheela Chawan
(74) *Attorney, Agent, or Firm*—William J. Burke

(57) ABSTRACT

Flash frames are detected in video streams, for example, by looking for short sequences of one or more frames (or, to be more general, pictures) in which the frames within the sequence are not well-correlated to the frames that immediately precede and follow the flash sequence, where those frames before and after the flash sequence are themselves well-correlated to each other. Video compression processing is then adjusted in some way to handle flash frames in a special manner. For example, since flash frames are poorly correlated to their neighboring frames, it would be best not to make predictions based on such flash frames when encoding other frames. Encoding flash frames as anchor frames (e.g., I or P frames in an MPEG encoder) would be detrimental to those frames that are predicted from the anchor frames. Rather, flash frames are preferably encoded as frames that are never used as references for coding other non-flash frames (e.g., as B frames in an MPEG encoder). As such, any errors in coding flash frames are limited to those frames and do not propagate to other frames in the video sequence.

28 Claims, 16 Drawing Sheets

FIG. 2

TABLE I. CONVENTIONAL VIDEO PROCESSING

| INPUT ORDER | | | | | | | | | | | | | | | | | | |
|---|---|---|---|---|---|---|---|---|---|---|---|---|---|---|---|---|---|---|
| I0 | B1 | B2 | P3 | B4 | B5 | P6 | B7 | B8 | P9 | B10 | B11 | P12 | B13 | B14 | I15 | B16 | B17 | P18 | ... |

| CODED ORDER | | | | | | | | | | | | | | | | | | |
|---|---|---|---|---|---|---|---|---|---|---|---|---|---|---|---|---|---|---|
| I0 | P3 | B1 | B2 | P6 | B4 | B5 | P9 | B7 | B8 | P12 | B10 | B11 | I15 | B13 | B14 | P18 | B16 | B17 | ... |

| TAP POSITION | | | | | | | | | | | | | | | | | | |
|---|---|---|---|---|---|---|---|---|---|---|---|---|---|---|---|---|---|---|
| T3 | T3 | T0 | T0 | T3 | T0 | T0 | T3 | T0 | T0 | T3 | T0 | T0 | T3 | T0 | T0 | T3 | T0 | T0 | ... |

FIG. 4

TABLE II. VIDEO PROCESSING (NO FLASH FRAMES)

| INPUT ORDER | | | | | | | | | | | | | | | | | | |
|---|---|---|---|---|---|---|---|---|---|---|---|---|---|---|---|---|---|---|
| I0 | B1 | B2 | P3 | B4 | B5 | P6 | B7 | B8 | P9 | B10 | B11 | P12 | B13 | B14 | I15 | B16 | B17 | P18 | ... |

| CODED ORDER | | | | | | | | | | | | | | | | | | |
|---|---|---|---|---|---|---|---|---|---|---|---|---|---|---|---|---|---|---|
| I0 | P3 | B1 | B2 | P6 | B4 | B5 | P9 | B7 | B8 | P12 | B10 | B11 | I15 | B13 | B14 | P18 | B16 | B17 | ... |

| TAP POSITION | | | | | | | | | | | | | | | | | | |
|---|---|---|---|---|---|---|---|---|---|---|---|---|---|---|---|---|---|---|
| T3 | T3 | T0 | T0 | T3 | T0 | T0 | T3 | T0 | T0 | T3 | T0 | T0 | T3 | T0 | T0 | T3 | T0 | T0 | ... |

FIG. 5

TABLE III. VIDEO PROCESSING (FRAME 6 = FLASH FRAME)

| INPUT ORDER | | | | | | | | | | | | | | | | | | |
|---|---|---|---|---|---|---|---|---|---|---|---|---|---|---|---|---|---|---|
| I0 | B1 | B2 | P3 | B4 | B5 | P6 | B7 | B8 | P9 | B10 | B11 | P12 | B13 | B14 | I15 | B16 | B17 | P18 | ... |

| CODED ORDER | | | | | | | | | | | | | | | | | | |
|---|---|---|---|---|---|---|---|---|---|---|---|---|---|---|---|---|---|---|
| I0 | P3 | B1 | B2 | P7 | B4 | B5 | B6 | P9 | B8 | P12 | B10 | B11 | I15 | B13 | B14 | P18 | B16 | B17 | ... |

| TAP POSITION | | | | | | | | | | | | | | | | | | |
|---|---|---|---|---|---|---|---|---|---|---|---|---|---|---|---|---|---|---|
| T3 | T3 | T0 | T0 | T4 | T0 | T0 | T0 | T2 | T0 | T3 | T0 | T0 | T3 | T0 | T0 | T3 | T0 | T0 | ... |

FIG. 15

TABLE IV. VIDEO PROCESSING (FRAME 6 = FLASH FRAME)

| INPUT ORDER | | | | | | | | | | | | | | | | | | |
|---|---|---|---|---|---|---|---|---|---|---|---|---|---|---|---|---|---|---|
| I0 | B1 | B2 | P3 | B4 | B5 | P6 | B7 | B8 | P9 | B10 | B11 | P12 | B13 | B14 | I15 | B16 | B17 | P18 | ... |

| CODED ORDER | | | | | | | | | | | | | | | | | | |
|---|---|---|---|---|---|---|---|---|---|---|---|---|---|---|---|---|---|---|
| I0 | P3 | B1 | B2 | P5 | B4 | P8 | B6 | B7 | P11 | B9 | B10 | I14 | B12 | B13 | I17 | B15 | B16 | P20 | ... |

| TAP POSITION | | | | | | | | | | | | | | | | | | |
|---|---|---|---|---|---|---|---|---|---|---|---|---|---|---|---|---|---|---|
| T3 | T3 | T0 | T0 | T2 | T0 | T0 | T3 | T0 | T0 | T3 | T0 | T0 | T3 | T0 | T0 | T3 | T0 | T0 | T3 |

FIG. 16

TABLE V. VIDEO PROCESSING (FRAME 6 = FLASH FRAME)

| INPUT ORDER | | | | | | | | | | | | | | | | |
|---|---|---|---|---|---|---|---|---|---|---|---|---|---|---|---|---|
| I0 | B1 | B2 | P3 | B4 | B5 | P6 | B7 | B8 | P9 | B10 | B11 | P12 | B13 | B14 | I15 | B16 | B17 | P18 | ... |

| CODED ORDER | | | | | | | | | | | | | | | | |
| I0 | P3 | B1 | B2 | P5 | B4 | P9 | B6 | B7 | B8 | P12 | B10 | B11 | I15 | B13 | B14 | P18 | B16 | B17 | ... |

| TAP POSITION | | | | | | | | | | | | | | | | |
| T3 | T3 | T0 | T0 | T2 | T0 | T4 | T0 | T0 | T0 | T3 | T0 | T0 | T3 | T0 | T0 | T3 | T0 | T0 | ... |

DETECTING AND CODING FLASH FRAMES IN VIDEO DATA

CROSS-REFERENCE TO RELATED APPLICATIONS

This application claims the benefit of the filing date of U.S. provisional application No. 60/101,701, filed on Sep. 25, 1998.

Government Support

This invention was at least partially supported by the Government contract No. 70NANB5H1178. The government may have certain rights in this invention.

BACKGROUND OF THE INVENTION

1. Field of the Invention

The present invention relates to image processing, and, in particular, to video compression processing.

2. Description of the Related Art

The primary goal in video compression processing is to reduce the number of bits used to represent sequences of video images while still maintaining an acceptable level of image quality during playback of the resulting compressed video bitstream. Another goal in many video compression applications is to maintain a relatively uniform bit rate, for example, to satisfy transmission bandwidth and/or playback processing constraints. Video compression processing often involves the tradeoff between bit rate and playback quality. This tradeoff typically involves reducing the average number of bits used to encode images in the original video sequence by selectively decreasing the playback quality of each image that is encoded into the compressed video bitstream.

Many video compression systems, such as those based on an MPEG (Moving Picture Experts Group) standard, gain much of their compression capability by making predictions from other, previously coded pictures. Although the term "frame" is used throughout in this specification, those skilled in the art will understand that the teachings of this specification apply generally to video pictures, a term that covers both video frames and video fields.

MPEG coders have three main types of frames: I, P, and B. An I frame is coded independently without reference to any other frames. A P frame is coded as the motion-compensated difference between itself and a reference frame derived from the previously coded P or I frame. I and P frames are referred to as anchor frames, because they can be used to generate reference frames for coding other frames. Macroblocks in a B frame are coded as the difference between itself and either (1) the previous anchor frame (i.e., forward prediction), (2) the next anchor frame (i.e., backward prediction), or (3) the average of the previous and next anchor frames (i.e., interpolated or bidirectional prediction). B frames are non-anchor frames that are never used to predict other frames. Thus, errors in B frames do not propagate to other frames and are one picture in duration. Note that the human visual system objects less to errors of very short duration.

Although the MPEG standards make no restrictions on a particular sequence of frame types, many coders simply use a repeating pattern of I, P, and B frames. Since B frames can be predicted from not only a previous frame, but a future frame as well, B frames must be sent to the decoder after the anchor frames that surround them. To make this "out-of-order" decoding efficient, the frames are encoded into the corresponding compressed video bitstream out of temporal order.

FIG. 1 shows a block diagram of a conventional video compression system 100 for reordering and encoding a stream of video frames into a compressed video bitstream. System 100 implements a video coding scheme that is based on a repeating frame pattern having two B frames between each pair of consecutive anchor frames (e.g., IBBPBBPBBPBBPBB for a 15-frame GOP (group of pictures)). Table I in FIG. 2 shows the relationship between the temporal order of frames (as they appear in the input video stream) and the order in which those frames are coded into a compressed video bitstream by system 100. Table I also shows the tap position of switch 104 used to reorder the video frames in order to generate the bitstream.

Frames are presented at the video input of system 100 in temporal order starting with Frame 0, then Frame 1, etc. As each new frame is presented at the video input, the frame stored in frame-delay buffer 102c is made available at tap T0 and the new frame is made available at tap T3. Depending on the position selected for two-position switch 104, encoder 106 codes either the frame at tap T0 or the frame at tap T3. As encoder 106 codes the selected frame, the frame stored in frame-delay buffer 102b is moved into frame-delay buffer 102c, the frame stored in frame-delay buffer 102a is moved into frame-delay buffer 102b, and the new frame is stored into frame-delay buffer 102a.

At the beginning of a video stream, when Frame 0 is presented at the video input and therefore at tap T3, switch 104 is positioned at tap T3 to enable encoder 106 to encode Frame 0 as an I frame (i.e., I0 in Table I). Processing of encoder 106 is then temporarily suspended until all the frame-delay buffers 102 are filled, such that Frame 0 is stored in buffer 102c and presented at tap T0, Frame 1 is stored in buffer 102b, Frame 2 is stored in buffer 102a, and Frame 3 is presented at the video input and at tap T3. At this time, switch 104 is again positioned at tap T3 so that Frame 3 can be coded as a P frame (i.e., P3 in Table I).

In the next processing cycle, Frame 1 is stored in buffer 102c and presented at tap T0, Frame 2 is stored in buffer 102b, Frame 3 is stored in buffer 102a, and Frame 4 is presented at the video input and at tap T3. At this time, switch 104 is positioned at tap T0 so that Frame 1 can be coded as a B frame (i.e., B1 in Table I).

In the next processing cycle, Frame 2 is stored in buffer 102c and presented at tap T0, Frame 3 is stored in buffer 102b, Frame 4 is stored in buffer 102a, and Frame 5 is presented at the video input and at tap T3. At this time, switch 104 is again positioned at tap T0 so that Frame 2 can be coded as a B frame (i.e., B2 in Table I).

In the next processing cycle, Frame 3 is stored in buffer 102c and presented at tap T0, Frame 4 is stored in buffer 102b, Frame 5 is stored in buffer 102a, and Frame 6 is presented at the video input and at tap T3. At this time, switch 104 is repositioned at tap T3 so that Frame 6 can be coded as a P frame (i.e., P6 in Table I).

This processing is continued for each frame in each 15-frame GOP in the video stream with switch 104 positioned at tap T0 to code a B frame and at tap T3 to code an anchor (I or P) frame according to the GOP pattern (IBBPBBPBBPBBPBB), as indicated in Table I.

Some video streams contain flash frames. For purposes of this specification, a sequence of flash frames is defined as set of one or more consecutive frames that are relatively poorly correlated to both the frame immediately preceding the flash sequence and the frame immediately following the flash sequence, where the frames immediately before and after the flash sequence are themselves relatively well-correlated to each other. A common example of a flash sequence is the phenomenon produced by still picture photographers at events, such as basketball games. A photographer's flash usually produces, in a video stream, a single frame that is mostly white, or at least with an intensity much higher than the frames both before and after. Such a flash frame (i.e., a one-frame flash sequence) will be poorly correlated to the temporally surrounding frames.

Some encoders are able to detect "scene cuts" by looking for a pair of consecutive frames that are highly uncorrelated to one another, where the degree of correlation may be characterized using a distortion measure, such as the mean absolute difference (MAD) of the motion-compensated interframe pixel differences. In response, such encoders may insert an I frame at the next scheduled anchor frame time (i.e., potentially replacing a regularly scheduled P frame with an I frame). Such encoders will mistakenly identify a flash sequence as a scene cut, based on the large distortion between the first frame in the flash sequence and its immediately preceding frame. Such a scene cut will be detected for individual, isolated flash frames as well as multi-frame flash sequences.

Assuming that the events that cause single flash frames (e.g., photographers' flashes) occur randomly with respect to the timing of the repeating GOP pattern, on average, a flash frame will fall on an anchor (I or P) frame 1 out of 3 times for the 15-frame GOP pattern of Table I. When that occurs, the encoder will identify the flash frame as a scene cut and code the flash frame as an I frame. Even if the encoder does not detect and adjust its processing for scene cuts, ⅓ of all flash frames on average will still be coded as anchor frames.

However, coding a flash frame as an I frame is a very bad idea, since, in that case, the flash frame will become the anchor frame for predicting the remainder of the frames in the GOP, but it will be poorly correlated to the other frames in the GOP, and the entire GOP (typically ½ second) will be badly coded (i.e., high quantization level required to meet limited bit rate requirements).

For example, in the sequence shown in Table I, assume that Frame 6 is an isolated flash frame. According to the GOP pattern, Frame 6 is to be predicted from Frame 3 for encoding as a P frame (i.e., P6). Since Frame 6 is a flash frame, it is probably poorly correlated to Frame 3. As a result, P6 will either require too many bits to render well, or it will be badly coded (i.e., large quantization errors). Furthermore, Frame 6 is the prediction frame for encoding Frame 9 as a P frame. Here, too, since flash-frame Frame 6 will probably be poorly correlated to Frame 9, Frame 9 will either exceed its budgeted bit allocation or it too will be badly coded. If Frame 9 is badly coded, then Frames 7 and 8 which are to be encoded as B frames B7 and B8, respectively, will have a bad choice of being predicted from an unrelated flash frame (P6) or a badly coded frame (P9). Either way, B7 and B8 will also probably be badly coded.

Next, the errors from P9 will propagate to Frame 12, since Frame 9 is Frame 12's predictor. If enough bits are spent, some of these errors may be reduced. Again, B frames B10 and B11 will suffer, either in picture quality or efficiency. The net effect is that a single, badly correlated flash frame can cause many frames to be badly coded, thereby adversely affecting the quality of the video playback for a significant number of frames.

SUMMARY OF THE INVENTION

The present invention is directed to a scheme for detecting and coding sequences of one or more flash frames in video streams. According to the present invention, the occurrence of a sequence of one or more consecutive flash frames is detected in a video stream by looking for a short sequence of frames in which the one or more frames in the sequence are fairly poorly correlated to the frames immediately preceding and following the sequence, while those frames immediately preceding and following the sequence are fairly well-correlated to one another. The coder then takes an appropriate action to code the flash sequence in an efficient manner. For example, in one possible implementation in which each sequence of flash frames contains only one frame, the isolated flash frames are coded as B frames, no matter where they would otherwise fall in the repeating GOP pattern of I, P, and B frames. In that case, the errors that occur in encoding the flash frame will be limited to the flash frame alone, since a B frame is never used as a predictor for other frames. Other coding options are also possible in alternative implementations.

According to one embodiment, the present invention is based on a method for processing a video stream. A flash sequence is detected in the video stream, wherein the flash sequence is a set of one or more consecutive pictures in which: (1) a picture preceding the flash sequence is poorly correlated to the flash sequence; (2) a picture following the flash sequence is poorly correlated to the flash sequence; and (3) the picture preceding the flash sequence is well-correlated to the picture following the flash sequence. Video processing is adjusted based on the detection of the flash sequence to generate part of a compressed video bitstream corresponding to the video stream.

According to another embodiment, the present invention is a system for processing a video stream, comprising: (a) a plurality of delay buffers connected in series; (b) a multi-tap switch configured to be positioned to receive picture data from an output of any one of the delay buffers; (c) a video encoder configured to the switch to receive and code the picture data into a compressed video bitstream corresponding to the video stream; and (d) a flash detector configured to detect a flash sequence in the video stream. The flash sequence is a set of one or more consecutive pictures in which: (1) a picture preceding the flash sequence is poorly correlated to the flash sequence; (2) a picture following the flash sequence is poorly correlated to the flash sequence; and (3) the picture preceding the flash sequence is well-correlated to the picture following the flash sequence. The video encoder adjusts video processing based on the detection of the flash sequence by the flash detector to generate part of the compressed video bitstream.

BRIEF DESCRIPTION OF THE DRAWINGS

Other aspects, features, and advantages of the present invention will become more fully apparent from the following detailed description, the appended claims, and the accompanying drawings in which:

FIG. 2 shows Table I, which shows the relationship between the temporal and coded orders of frames as well as the tap position of the switch of the system of FIG. 1 used to reorder the video frames from the temporal order to the coded order;

FIG. 4 shows Table II, which shows the relationship between the temporal and coded orders of frames as well as the tap position of the switch of the system of FIG. 3 used to reorder the video frames from the temporal order to the coded order for a GOP having no flash frames;

FIG. 5 shows Table III, which shows the relationship between the temporal and coded orders of frames as well as the tap position of the switch of the system of FIG. 3 used to reorder the video frames from the temporal order to the coded order for a GOP having a flash frame at Frame 6;

FIG. 15 shows Table IV, which shows the relationship between the temporal and coded orders of frames as well as the tap position of the switch of the system of FIG. 3 used to reorder the video frames from the temporal order to the coded order for a GOP having a flash frame at Frame 6, where the anchor frame is advanced in the GOP structure and the GOP size is reduced by one frame; and FIG. 16 shows Table V, which shows the relationship between the temporal and coded orders of frames as well as the tap position of the switch of the system of FIG. 3 used to reorder the video frames from the temporal order to the coded order for a GOP having a flash frame at Frame 6, where the anchor frame is advanced in the GOP structure and the GOP size is maintained.

DETAILED DESCRIPTION

Figure 1:
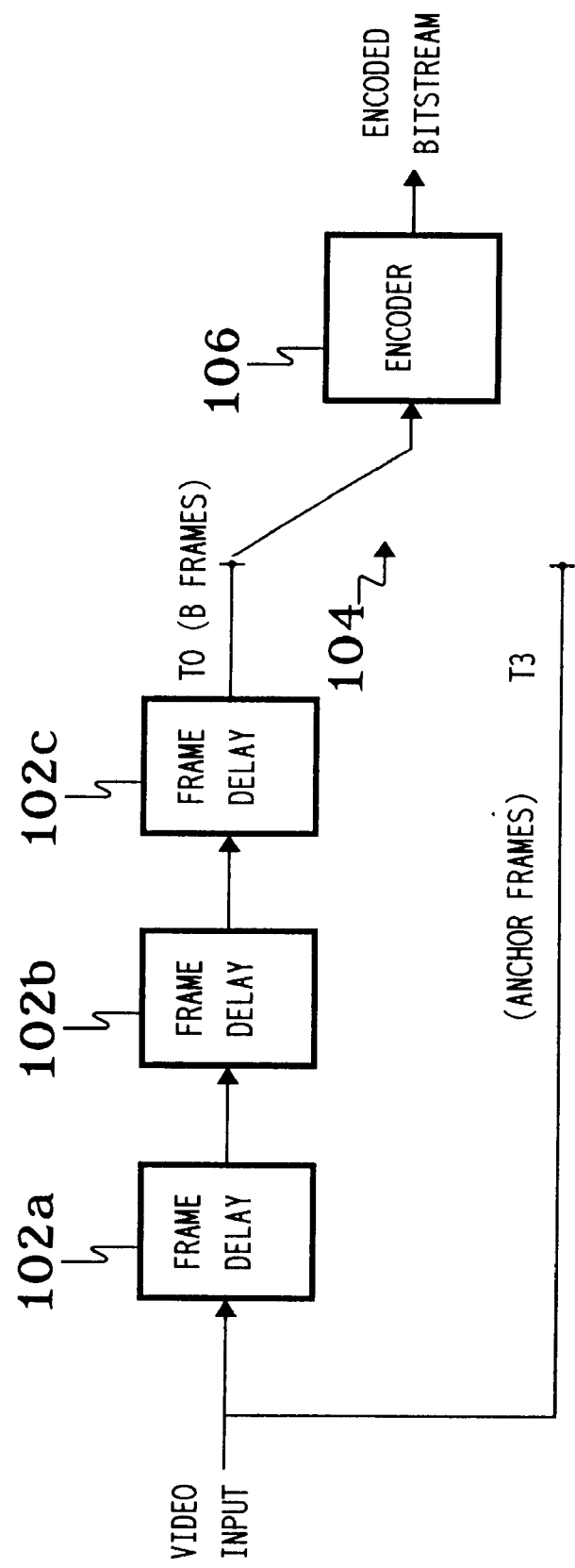
FIG. 1 shows a block diagram of a conventional video compression system for reordering and encoding a stream of video frames into a compressed video bitstream.

There are different possible strategies for handling flash frames in video streams. For single-frame flash sequences, one strategy is to make sure that all isolated flash frames are coded as B frames. Because B frames are displayed and then discarded by decoders and are not used to derive predictions for other frames, any errors in B-coded flash frames will appear only in the frames themselves and do not propagate. Furthermore, since a single flash frame is essentially completely white and only gives the effect of a flash, it does not need to be coded with any great fidelity, especially since it will not be used to predict any other frames. Even if a flash frame was already scheduled to be coded as a B frame under the normal GOP pattern, very few bits need be used to code the flash frame, possibly leaving additional bits to be used to improve the quality of other surrounding frames.

According to one strategy, if a flash frame is scheduled to be coded as a P frame under the normal GOP pattern, it is instead coded as a B frame. The very next frame, which would have been coded as a B frame under the normal GOP pattern, is instead coded as a P frame and used as the anchor frame for coding the surrounding B frames, including the flash frame. For example, if Frame 6 in the video sequence shown in Table I is a flash frame, instead of coding it as a P frame, it is coded as a B frame (i.e., B6), and Frame 7 is coded as a P frame (i.e., P7), instead of coding it as a B frame, as it would have been under the normal GOP pattern. Since P7 is an anchor frame for coding Frames 4, 5, and 6, it must be coded before Frames 4, 5, and 6 in the bitstream.

In one implementation of this strategy, the GOP in which the flash frame occurs can be extended by one frame (e.g., with Frames 10 and 13 in the previous example coded as P frames instead of Frames 9 and 12 as in the normal GOP pattern, resulting in a 16-frame GOP).

In another implementation, subsequent processing within the GOP can ensure that the overall size of the GOP is not increased (e.g., by decreasing the number of B frames between a later pair of anchor frames within the GOP). Continuing with the previous example, after coding Frame 7 as a P frame and Frame 6 as a B frame, Frame 9 is coded as a P frame and Frame 8 is then coded as a B frame, so that only one B frame (B8) is coded based on two P frames (P7 and P9). From then on, the normal GOP pattern applies and the original 15-frame size of the GOP is maintained. This implementation has advantages over the previous extended-GOP implementation in that it only rearranges the picture types within the GOP without changing its length. As such, total GOP bit allocations determined by a rate control system need not be changed.

In either implementation, if a flash frame was already scheduled to be coded as a B frame under the normal GOP pattern, it is kept as a B frame, although, as suggested earlier, its bit allocation can possibly be reduced.

If a flash frame was scheduled to be coded as an I frame under the normal GOP pattern, a number of possible implementations are possible. The flash frame can be coded as a B frame, extending the previous GOP by one frame. In one implementation, the next GOP is just delayed by one frame, but the GOP pattern returns to normal. In another implementation, processing in the next GOP is adjusted, essentially to drop one frame from the GOP pattern, to ensure that the two affected GOPs together have the same number of frames as two normal GOPs. After that second GOP, processing returns to the normal GOP pattern for subsequent GOPs.

Another possible approach is to code a flash frame that was originally scheduled as an I frame, as an isolated I frame of a one-frame GOP, and then code the very next frame as the I frame of either a normal GOP or a GOP reduced by one frame. These implementations may be less desirable from a bit allocation perspective than implementations in which all flash frames are coded as B frames.

Another possible strategy is to skip isolated flash frames completely by omitting them from the compressed video bitstream. Yet another strategy is to substitute other data for the flash frame data. This can be implemented in different ways. For example, the flash frame could be coded as an all-white B frame. Alternatively, the flash frame could be coded as a bidirectionally predicted B frame with no correction data so that the decoder will decode the flash frame as the average between the two corresponding anchor frames. In another implementation, the flash frame could be specified to be identical to the nearest anchor frame. In yet another implementation, flash frame data could be replaced with video data that corresponds to an interpolation between frames preceding and following the flash frame. This interpolation could involve motion vector interpolation as well as pixel level interpolation.

For multi-frame flash sequences, video compression processing can be adjusted to encode each flash sequence as its own GOP with its own unique GOP pattern with the first frame in the flash sequence being coded as an I frame and the rest of the flash frames in the sequence predicted as B and possibly P frames based ultimately on that first I frame. The frame immediately following the flash sequence can then be coded as an I frame at the beginning of the next GOP returning to the normal GOP pattern.

Another strategy for multi-frame flash sequences is to code all of the flash frames as B frames no matter how long the flash sequence is. Of course, some limit needs to be put on the allowable size of a flash sequence to distinguish flash sequences from relatively short scenes. Depending on the implementation, allowable flash sequences may even be limited to the case of single-frame isolated flash frames.

Figure 3:
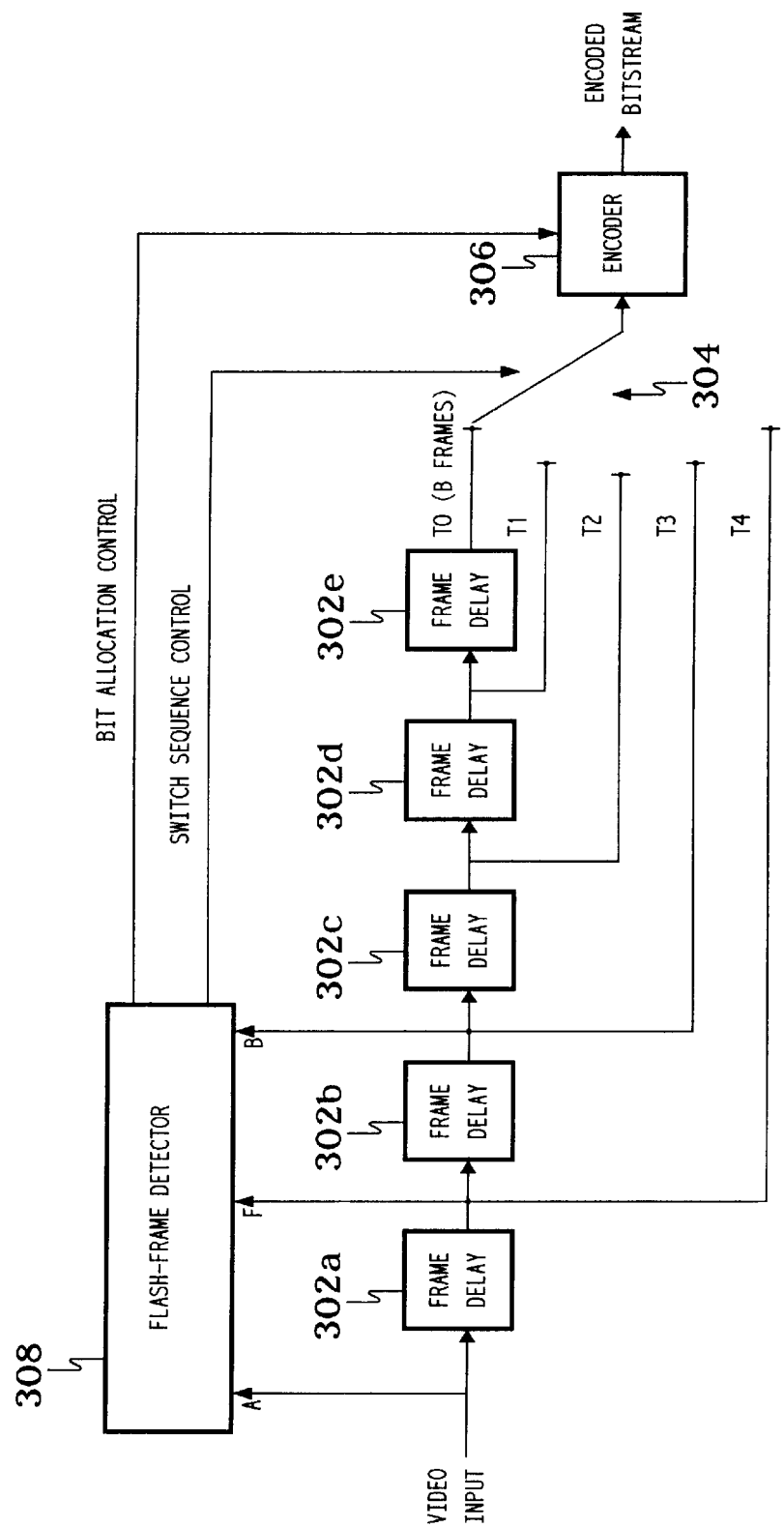
FIG. 3 shows a block diagram of a video compression system for reordering and encoding a stream of video frames into a compressed video bitstream, according to one embodiment of the present invention.

FIG. 3 shows a block diagram of a video compression system 300 for reordering and encoding a stream of video frames into a compressed video bitstream, according to one embodiment of the present invention. System 300 comprises 5 frame-delay buffers 302, 5-position switch 304, video encoder 306, and flash-frame detector 308. System 300 is designed to operate with the same 15-frame GOP pattern as system 100 (i.e., IBBPBBPBBPBBPBB). However, system 300 is designed to detect the presence of isolated flash frames (i.e., one-frame flash sequences) in a video stream and to adjust video compression processing according to a strategy that dictates that all flash frames be encoded as B frames.

Table II in FIG. 4 shows the relationship between the temporal order of frames (as they appear in the input video stream) and the order in which those frames are coded into a compressed video bitstream by system 300 when no flash frames are detected. Table II also shows the tap position of switch 304 used to reorder the video frames in order to generate the bitstream. Frames are presented at the video input of system 300 in temporal order starting with Frame 0, then Frame 1, etc. As each new frame is presented at the video input, the frame stored in frame-delay buffer 302e is made available at tap T0, the frame stored in frame-delay buffer 302d is made available at tap T1, the frame stored in frame-delay buffer 302c is made available at tap T2, the frame stored in frame-delay buffer 302b is made available at tap T3, and the frame stored in frame-delay buffer 302a is made available at tap T4.

Depending on the position selected for 5-position switch 304, encoder 306 codes the frame available at the corresponding tap. As encoder 306 codes the selected frame, the frame stored in buffer 302d is moved into buffer 302e, the frame stored in buffer 302c is moved into buffer 302d, the frame stored in buffer 302b is moved into buffer 302c, the frame stored in buffer 302a is moved into buffer 302b, and the new frame is stored into buffer 302a.

Figure 6:
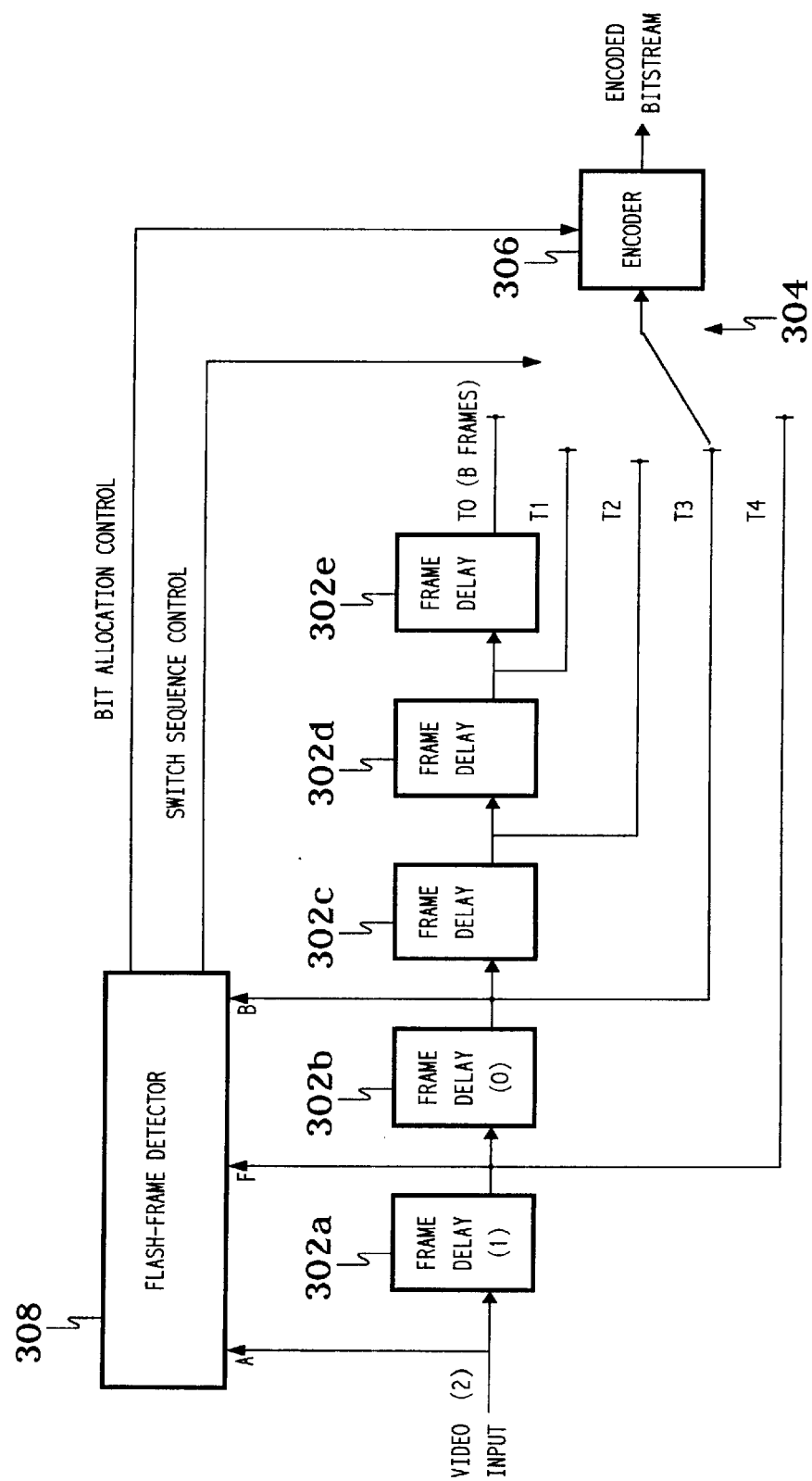
FIGS. 6–14 show the states of the system of FIG. 3 when Frames 2 and 5–12, respectively, are presented at the video input of the system of FIG. 3.

At the start of a video stream, processing begins after a short delay. FIG. 6 shows the state of video compression system 300 when Frame 2 is presented at the video input to system 300, with Frame 0 stored in buffer 302b and presented at tap T3, and Frame 1 stored in buffer 302a and presented at tap T4. At this time, switch 304 is positioned at tap T3 to enable encoder 306 to encode Frame 0 as an I frame (i.e., I0 in Table II).

Figure 7:
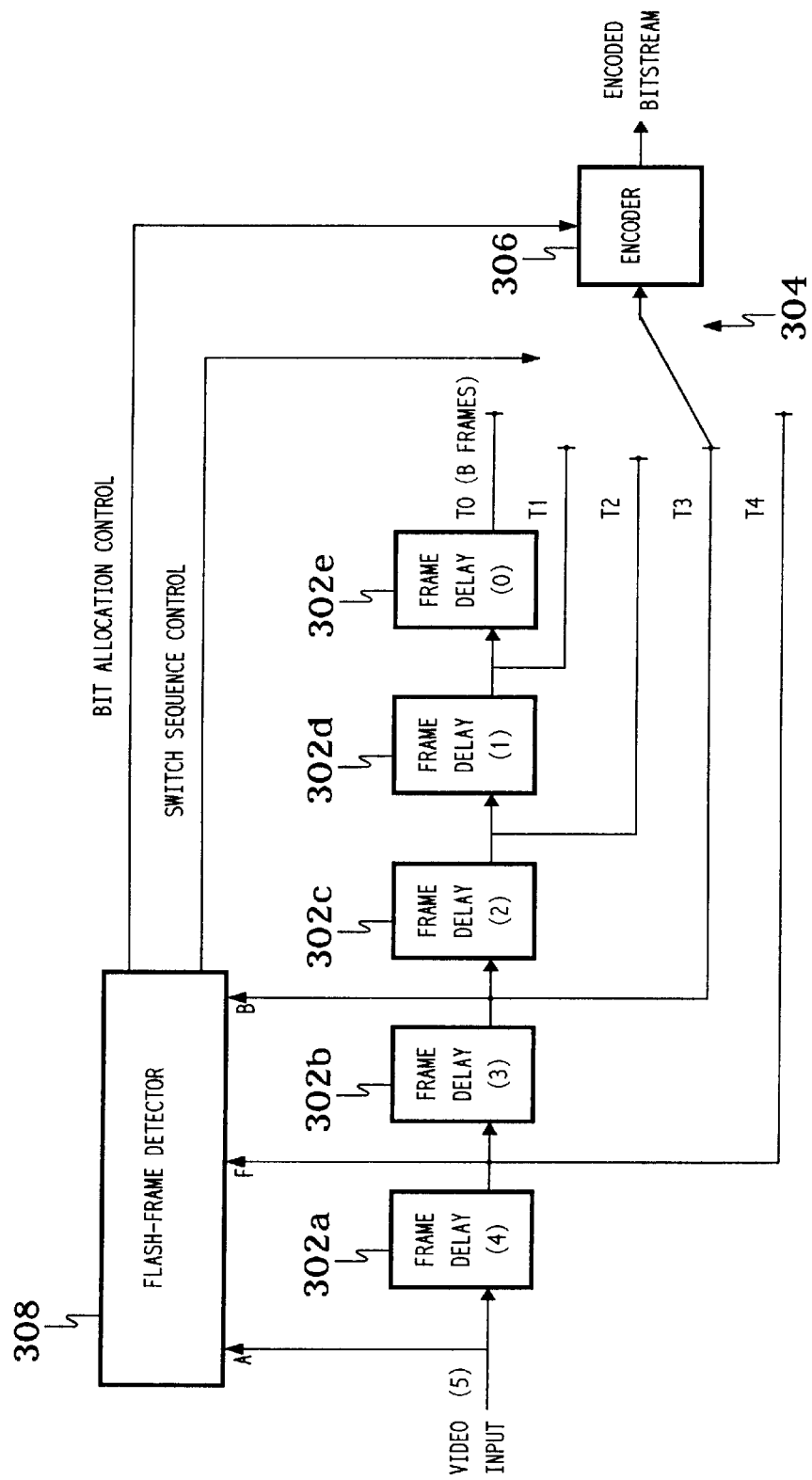

Processing of encoder 306 is then temporarily suspended until all the buffers 302 are filled. FIG. 7 shows the state of video compression system 300 when Frame 5 is presented at the video input to system 300, with Frame 0 stored in buffer 302e and presented at tap T0, Frame 1 stored in buffer 302d and presented at tap T1, Frame 2 stored in buffer 302c and presented at tap T2, Frame 3 stored in buffer 302b and presented at tap T3, and Frame 4 stored in buffer 302a and presented at tap T4. At this time, switch 304 is again positioned at tap T3 so that Frame 3 can be coded as a P frame (i.e., P3 in Table II).

Figure 8:
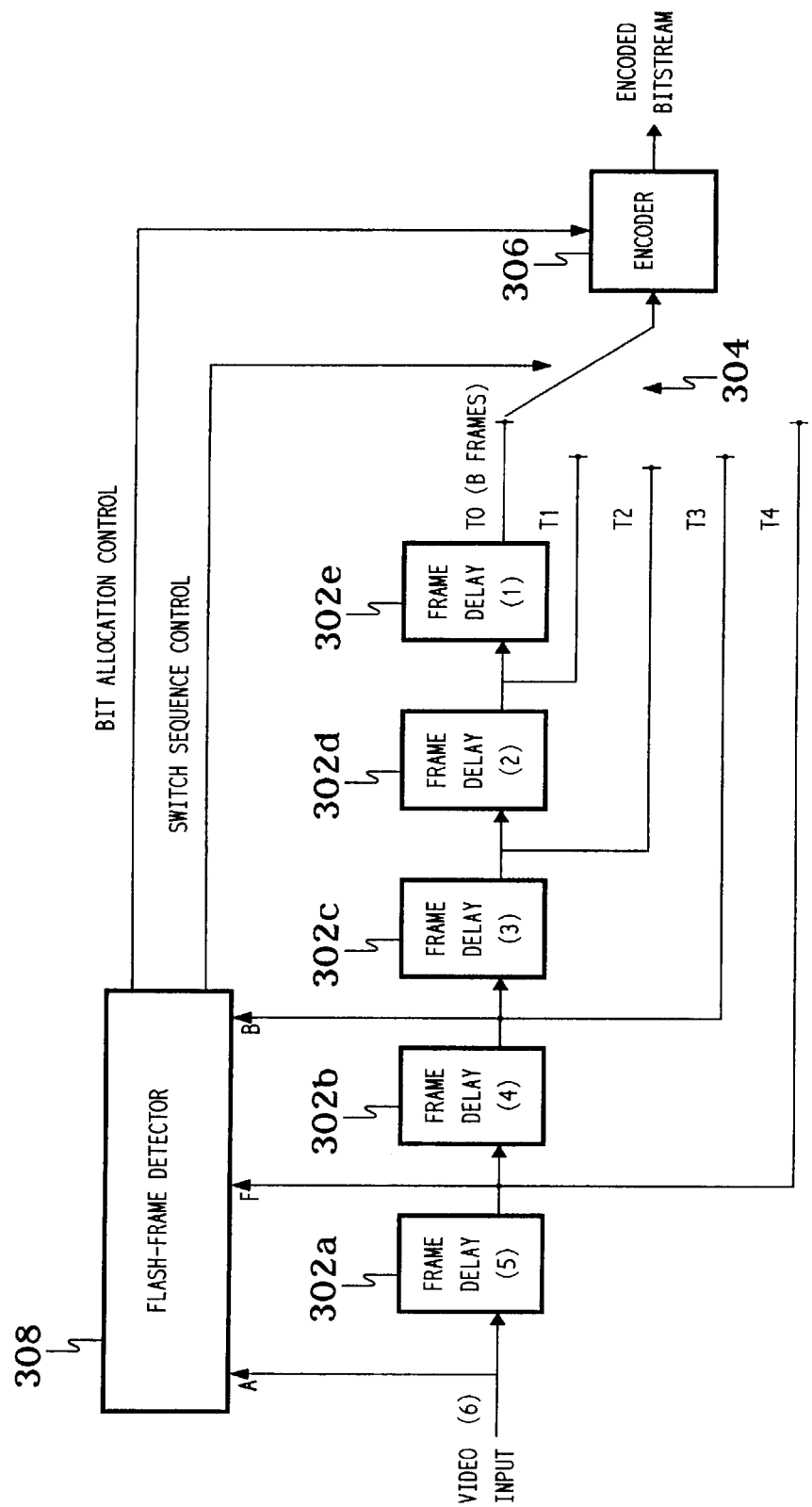

FIG. 8 shows the state of video compression system 300 at the next processing cycle when Frame 6 is presented at the video input to system 300, with Frame 1 stored in buffer 302e and presented at tap T0, Frame 2 stored in buffer 302d and presented at tap T1, Frame 3 stored in buffer 302c and presented at tap T2, Frame 4 stored in buffer 302b and presented at tap T3, and Frame 5 stored in buffer 302a and presented at tap T4. At this time, switch 304 is positioned at tap T0 so that Frame 1 can be coded as a B frame (i.e., B1 in Table II).

Figure 9:
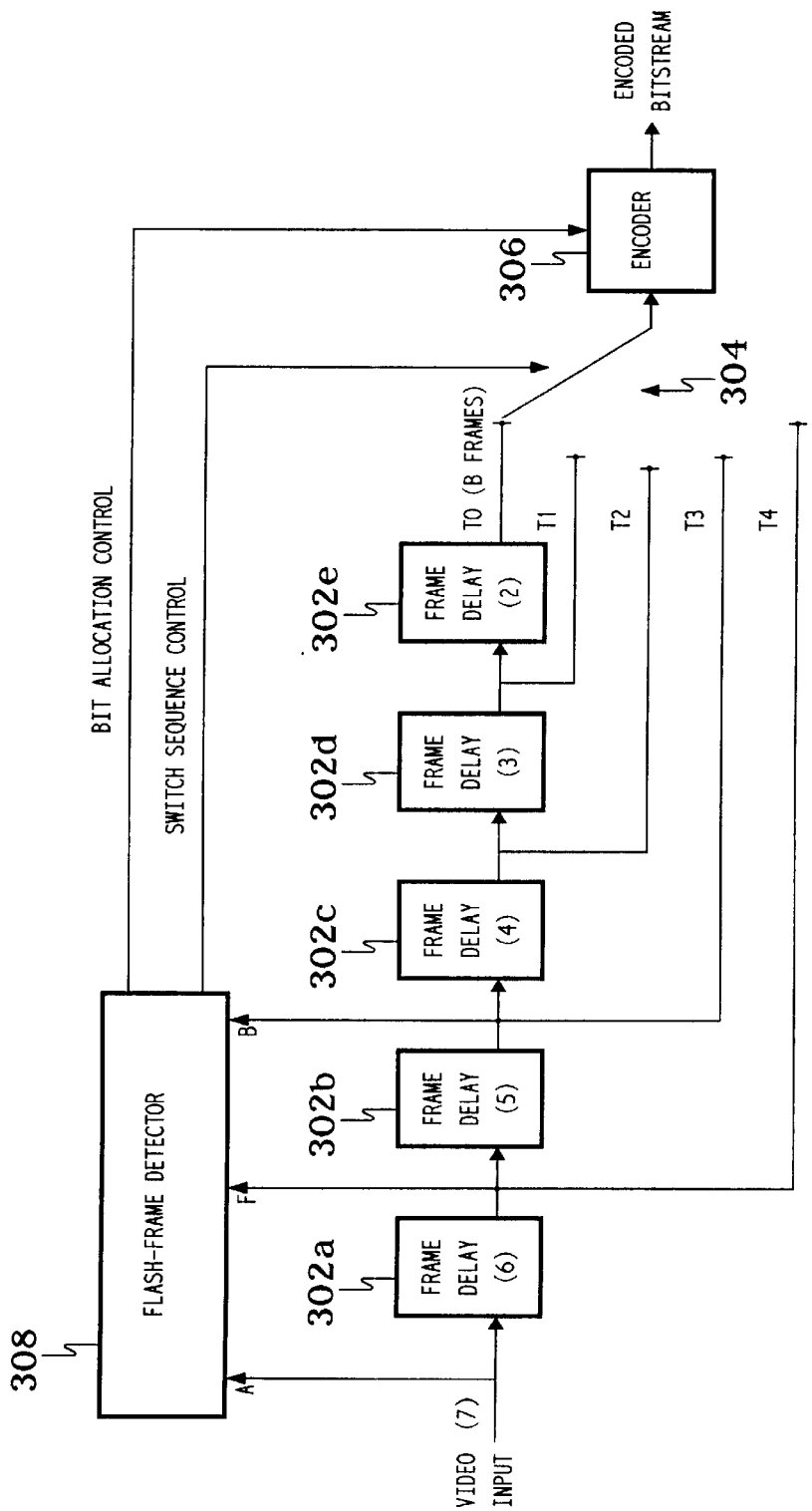

FIG. 9 shows the state of video compression system 300 at the next processing cycle when Frame 7 is presented at the video input to system 300, with Frame 2 stored in buffer 302e and presented at tap T0, Frame 3 stored in buffer 302d and presented at tap T1, Frame 4 stored in buffer 302c and presented at tap T2, Frame 5 stored in buffer 302b and presented at tap T3, and Frame 6 stored in buffer 302a and presented at tap T4. At this time, switch 304 is again positioned at tap T0 so that Frame 2 can be coded as a B frame (i.e., B1 in Table II).

Figure 10:
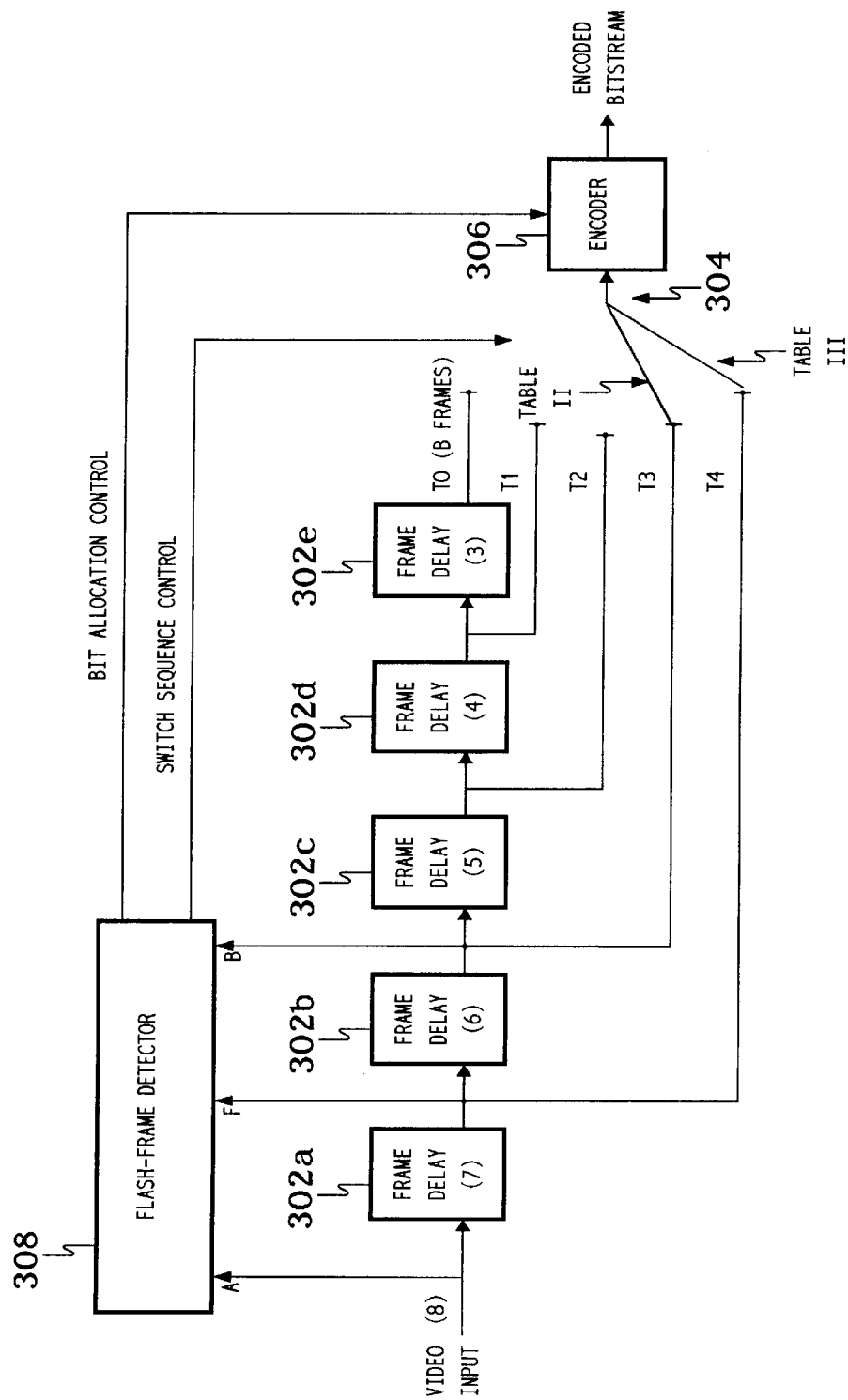

FIG. 10 shows the state of video compression system 300 at the next processing cycle when Frame 8 is presented at the video input to system 300, with Frame 3 stored in buffer 302e and presented at tap T0, Frame 4 stored in buffer 302d and presented at tap T1, Frame 5 stored in buffer 302c and presented at tap T2, Frame 6 stored in buffer 302b and presented at tap T3, and Frame 7 stored in buffer 302a and presented at tap T4. At this time, switch 304 is repositioned at tap T3 so that Frame 6 can be coded as a P frame (i.e., P6 in Table II).

This processing is continued for each frame in each 15-frame GOP in the video stream with switch 304 positioned at tap T0 to code a B frame and at tap T3 to code an anchor frame, as indicated in Table II. Note that Table II is identical to Table I. This indicates the desired result that the processing of video compression system 300 of FIG. 3 of the present invention produces the same GOP pattern as the processing of prior-art video compression system 100 of FIG. 1, when system 300 detects no flash frames in the video stream.

As each new frame (frame A in FIG. 3) is presented at the video input to system 300, flash-frame detector 308 analyzes the new frame A and the two immediately preceding frames (i.e., frame F stored in buffer 302a and frame B stored in buffer 302b) in the video stream to determine whether frame F is a flash frame. If (i) frame F is not sufficiently correlated to frame A and (ii) frame F is not sufficiently correlated to frame B, but (iii) frame A is well-correlated to frame B, then detector 308 determines that frame F is a flash frame. Otherwise, if any one or more of those three conditions are not met, then detector 308 determines that frame F is not a flash frame. The third condition (i.e., the comparison of frames A and B) is used to avoid erroneously characterizing a scene cut as a flash frame.

Depending on the particular implementation, characterizing the correlation of two frames can be achieved in different ways. For example, motion estimation can be used to generate a measure of interframe distortion, such as the mean absolute difference (MAD) between two frames, and this measure can then be compared to an appropriate threshold level to determine whether the two frames are well-correlated or not sufficiently correlated. Note that the threshold level used to determine whether frames A and B are well-correlated to one another (i.e., the third condition) may be different from the threshold level used to determine whether frames A and F and frames F and B are not sufficiently correlated to one another (the first two conditions).

When flash-frame detector 308 determines that a particular frame F is a flash frame, it sends appropriate control signals to switch 304 and encoder 306 to adjust their processing accordingly starting with the next video processing cycle. Table III in FIG. 5 shows the relationship between the temporal order of frames (as they appear in the input video stream) and the order in which those frames are coded into a compressed video bitstream by system 300, according to one possible implementation of the present invention, when detector 308 determines that Frame 6 in the video stream is a flash frame. Table III also shows the tap position of switch 304 used to reorder the video frames in order to generate the bitstream. As indicated in Table III, the results of the processing of system 300 are identical to those of system 300 shown in Table II for the first three frames (Frames 0–2) of the video stream. From there, however, the results differ.

FIG. 8 shows the state of video compression system 300 when flash Frame 6 is presented at the video input to system 300, at which time flash-frame detector 308 analyzes Frames 6, 5, and 4 as frames A, F, and B, respectively. Since Frame 6 is a flash frame, it will probably not be well-correlated with either Frame 5 or Frame 4, but Frames 5 and 4 will likely be well-correlated with each other (assuming that the flash Frame 6 occurs somewhere in the middle of a sequence of otherwise well-correlated frames). Although Frame 6 will satisfy the first condition that frame A (i.e., Frame 6) not be sufficiently correlated with frame F (i.e., Frame 5), the other two conditions for flash-frame detection will not be met, because frame A (i.e., Frame 6) will likely be poorly correlated with frame B (i.e., Frame 4) and frame F (i.e., Frame 5) will likely be well-correlated with frame B (i.e., Frame 4). As such, flash-frame detector 308 will determine that Frame 5 (i.e., current frame F) is not a flash frame, and detector 308 will instruct switch 304 to be positioned at tap T0 for the next processing cycle to present Frame 2 to encoder 306 for coding as a B frame as indicated in Table III.

FIG. 9 shows the state of video compression system 300 when Frame 7 is presented at the video input to system 300, at which time flash-frame detector 308 analyzes Frames 7, 6, and 5 as frames A, F, and B, respectively. Since Frame 6 is a flash frame, it will probably not be well-correlated with either Frame 7 and Frame 5, but Frames 7 and 5 will likely be well-correlated with each other. In this case, all three conditions for flash-frame detection will be met, flash-frame detector 308 will determine that Frame 6 (i.e., current frame F) is a flash frame, and detector 308 will instruct switch 304 to be positioned at tap T4 for the next processing cycle (see FIG. 10) to present Frame 7 to encoder 306 for coding as a P frame as indicated in Table III.

Figure 11:
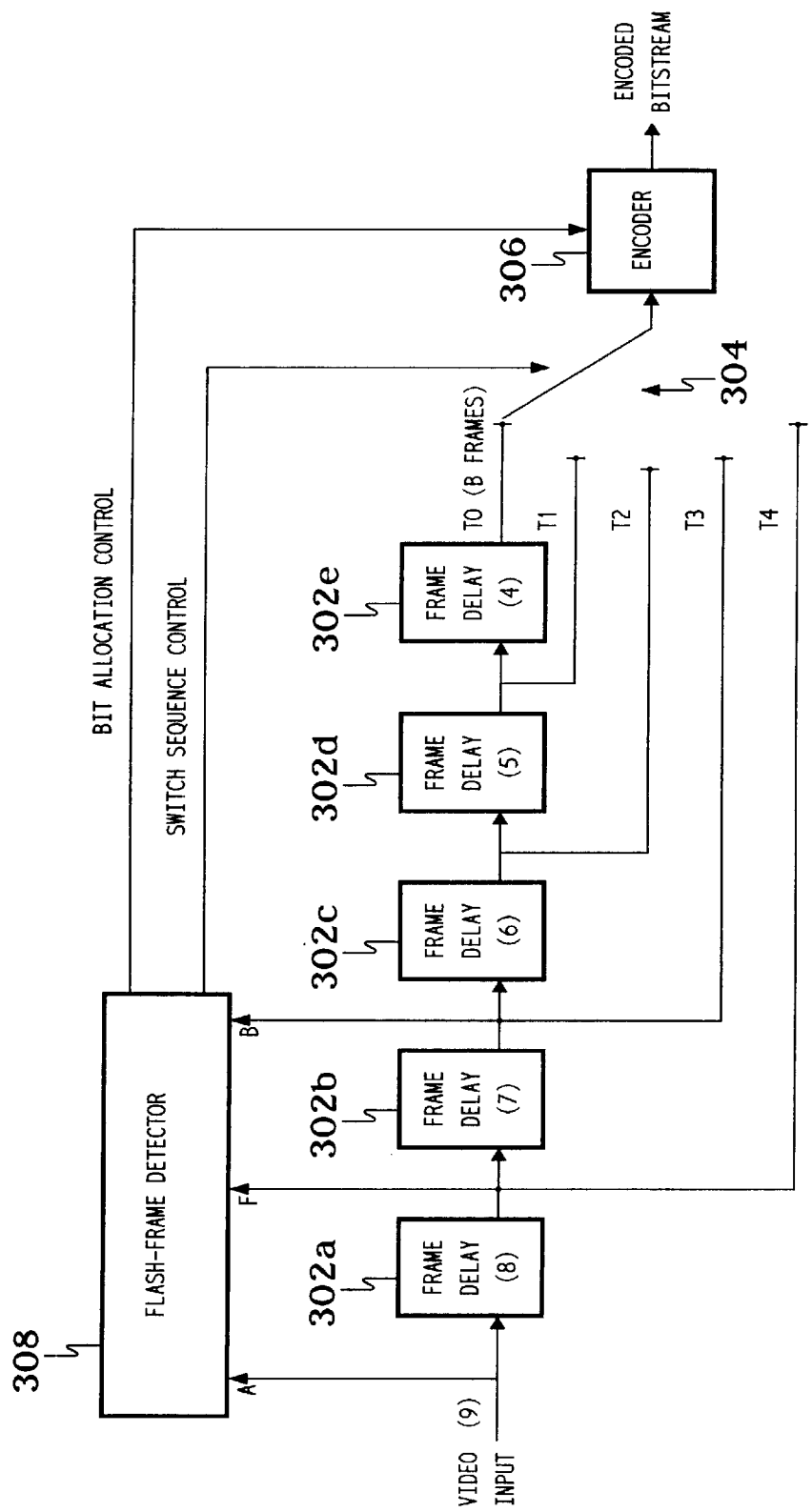
Figure 12:
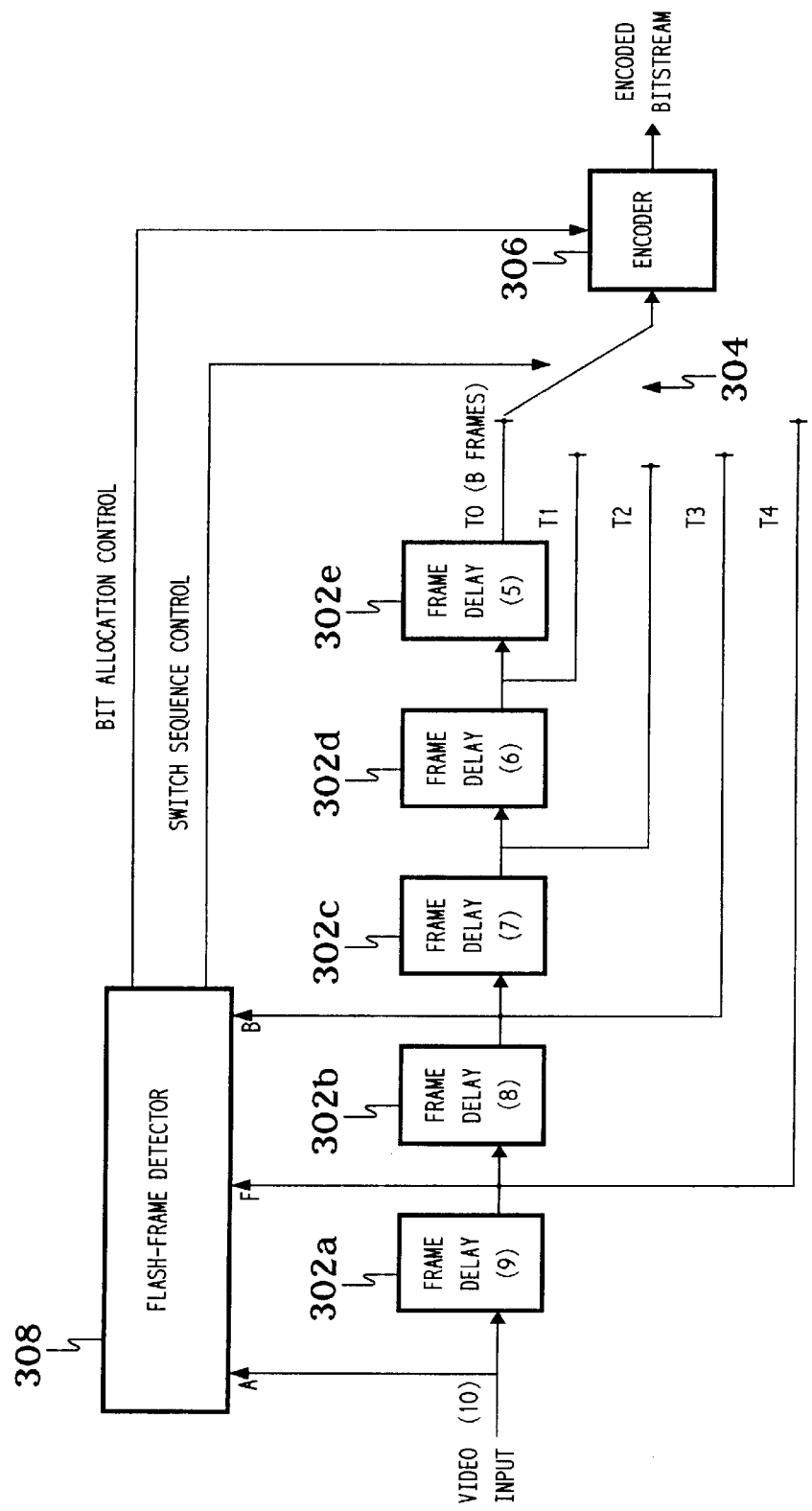

FIGS. 10–12 show the states of video compression system 300 when Frames 8, 9, and 10 are presented at the video input to system 300, respectively. In each of these cases, flash-frame detector 308 will determine that the current frame F is not a flash frame, and detector 308 will instruct switch 304 to be positioned at tap T0 for the next processing cycle (see FIGS. 11–13, respectively) to present Frames 4, 5, and 6, respectively, to encoder 306 for coding as a B frame as indicated in Table III.

Figure 13:
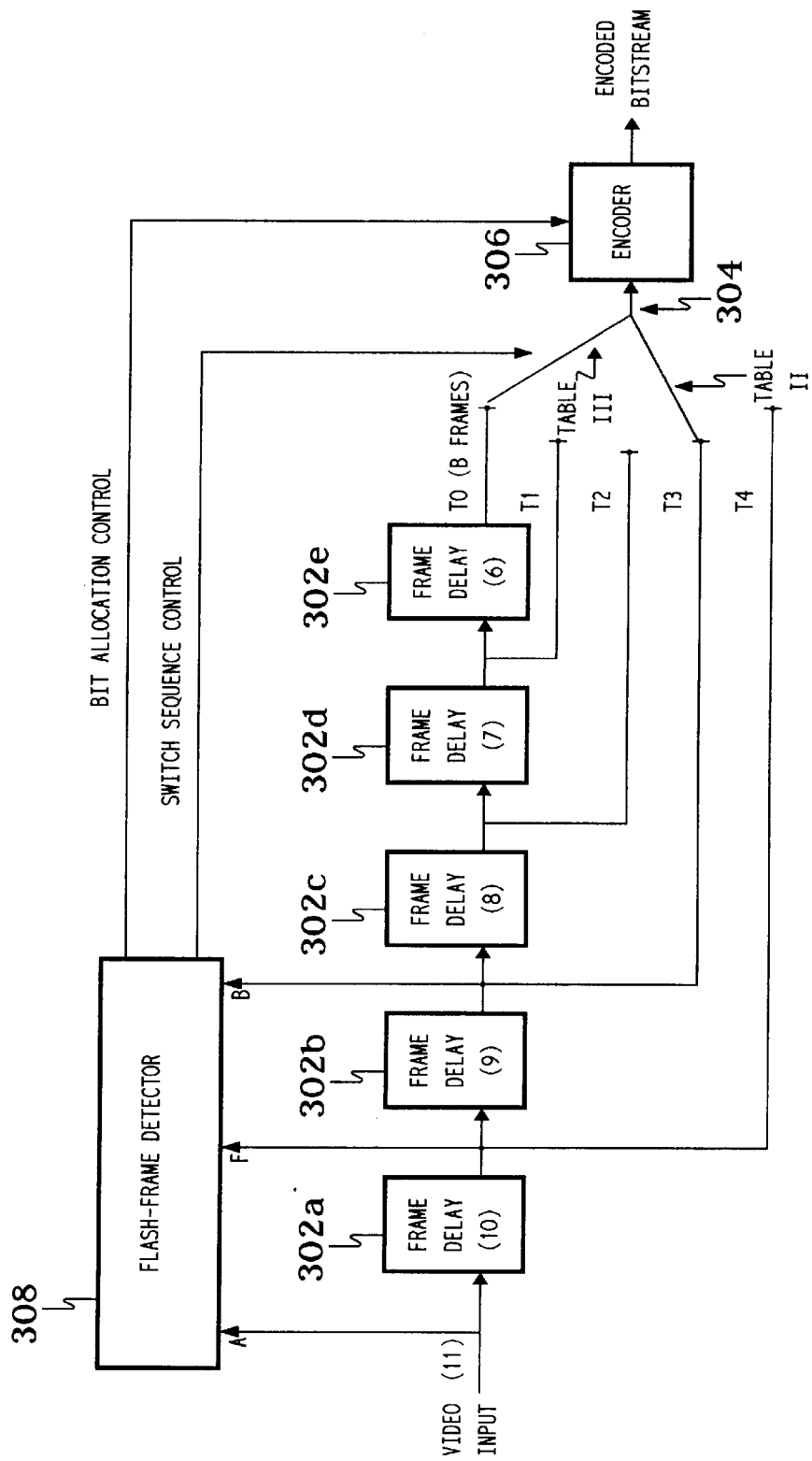
Figure 14:
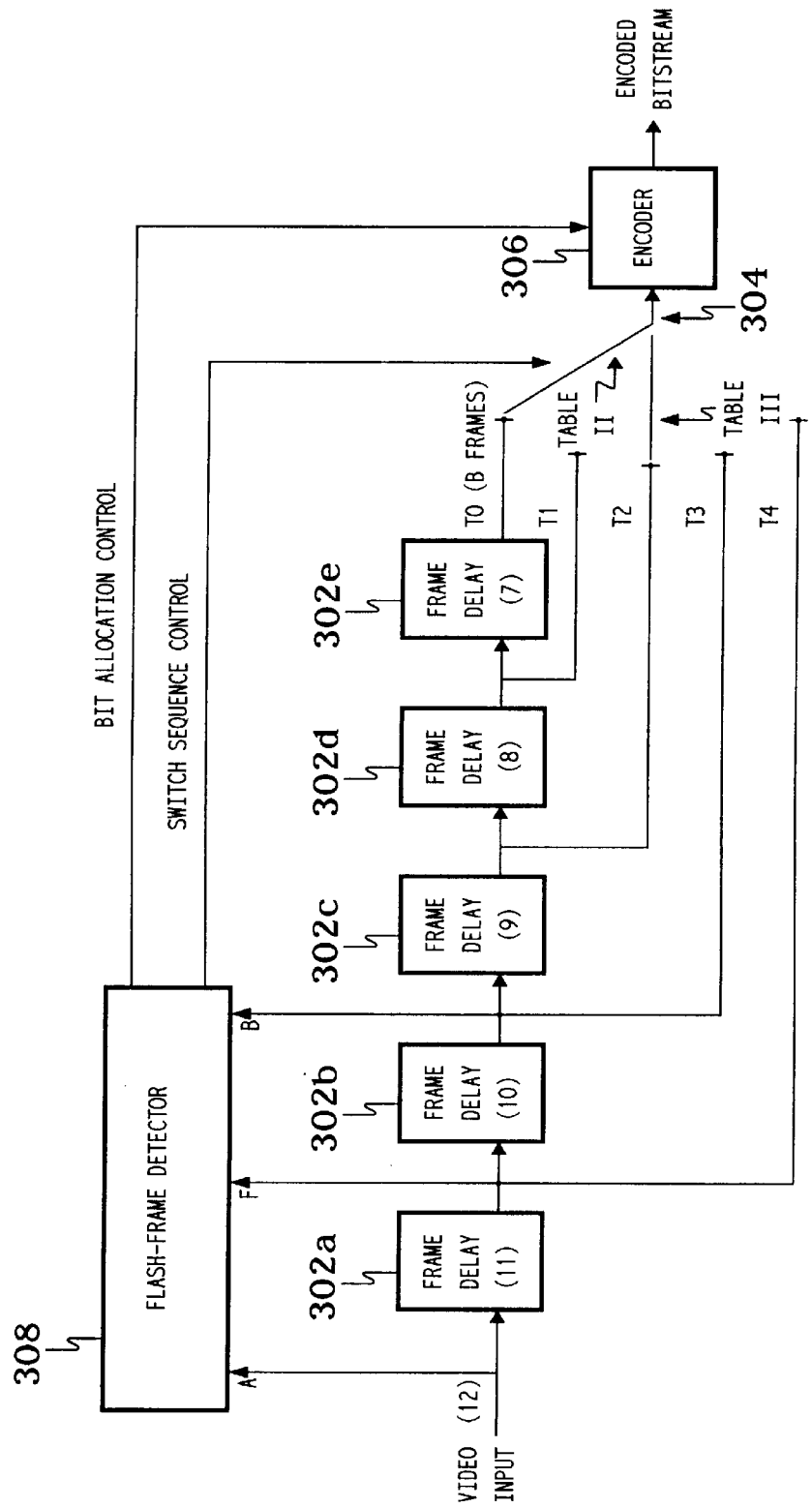

FIG. 13 shows the state of video compression system 300 when Frame 11 is presented at the video input to system 300. In this case, flash-frame detector 308 will instruct switch 304 to be positioned at tap T2 for the next processing cycle (see FIG. 14) to present Frame 9 to encoder 306 for coding as a P frame as indicated in Table III. In this way, the video compression processing is adjusted to ensure that the size of the GOP is not extended. From this point on, the processing results presented in Table III again conform to those in Table II.

In general, switch 304 is positioned at tap T0 to encode a frame as a B frame, and it is positioned at tap TM to encode a frame as a P frame, where M is the distance between the P frame and the previous anchor frame. Thus, according to Table III, switch 304 is positioned at T4 to code Frame 7 as a P frame, because the distance between P3 and P7 is 4 frames, and switch 304 is positioned at T2 to code Frame 9 as a P frame, because the distance between P7 and P9 is 2 frames.

In addition to sending switch sequence control signals to switch 304, detector 308 also sends bit allocation control signals to encoder 306 to inform encoder 306 when a flash frame has been detected so that the encoder can make appropriate modifications to the number of bits to be allocated to the flash frame. One possibility is to greatly reduce the number of bits allocated to the flash frame and redistribute those bits to other frames. Note that this reallocation of bits may be performed whether or not a change in the anchor frame distance is performed. That is, if the flash frame was already scheduled to be coded as a B frame under the normal GOP pattern, bit reallocation may still be performed to advantage.

Depending on the application, video compression system 300 of FIG. 3 can be implemented either in hardware (e.g., in integrated circuitry of a digital signal processing (DSP) chip) or in software (e.g., on a general-purpose microprocessor) for either real-time or non-real-time processing.

Video compression system 300 of FIG. 3 is designed to detect and handle isolated flash frames in video streams for a GOP pattern in which two B frames are normally coded between each pair of consecutive anchor frames. The present invention can also be implemented for other GOP patterns and/or to detect and handle multi-frame flash sequences, although such implementations may require additional frame delays, which in turn may limit the usefulness of such implementations to non-real-time applications where latency may not be an issue. It will also be understood that each frame-delay buffer in FIG. 3 can be replaced by two "field-delay" buffers to allow detection of flash frames that are an odd number of fields in duration.

According to the present invention, video processing is adjusted when a regularly scheduled anchor frame is determined to be a flash frame. In the implementations described earlier in this specification, the video processing is adjusted by coding the flash frame as a B frame and delaying the occurrence of the next anchor frame by one frame. Alternatively, the present invention can be implemented by advancing the anchor frame by one frame in the GOP structure, rather than by delaying the anchor frame by one frame. In these implementations, the frame immediately preceding the flash frame—which would normally be coded as a B frame—is instead coded as an anchor frame and the flash frame is coded as a B frame. In that case, the GOP can be reduced in size by one frame (see the example in Table IV of FIG. 15) or subsequent processing within the GOP can be adjusted (e.g., by increasing the number of B frames between a subsequent pair of anchor frames in the GOP) to ensure that the GOP size is not changed (see the example in Table V of FIG. 16). By allowing the GOP to be reduced in size, the present invention can be implemented with less memory than some of the other implementations (as indicated by the tap positions in Table IV).

The present invention has been described in the context of implementations having a plurality of delay buffers connected in series. The present invention can be implemented using a set of discrete delay buffers connected in series. Alternatively, the present invention can be implemented using a single memory device to store the various frames, where one or more memory pointers are used to refer to different frames, thereby operating the single memory device effectively as multiple buffers connected in series. The phrase "a plurality of delay buffers connected in series" will be understood to cover both implementations, as well as possibly other alternative implementations appreciated by those skilled in the art.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented method for processing an uncompressed video stream, comprising the steps of:
   (a) detecting a flash sequence in the uncompressed video stream, wherein the flash sequence is a set of one or more consecutive pictures in which:
   (1) a picture preceding the flash sequence is poorly correlated to the flash sequence;
   (2) a picture following the flash sequence is poorly correlated to the flash sequence; and
   (3) the picture preceding the flash sequence is well-correlated to the picture following the flash sequence, wherein step (a) comprises the step of determining that the picture preceding the flash sequence is well-correlated to the picture following the flash sequence; and
   (b) adjusting video compression processing based on the detection of the flash sequence to generate part of a compressed video bitstream corresponding to the uncompressed video stream.

2. The method of claim 1, wherein step (b) comprises the step of adjusting an allocation of bits used to code the flash sequence.

3. The method of claim 2, wherein step (b) reduces the allocation of bits used to code the flash sequence.

4. The method of claim 1, wherein the flash sequence consists of a single flash picture.

5. The method of claim 1, wherein step (b) comprises the step of ensuring that each picture in the flash sequence is coded as a non-anchor picture that is not used as a reference to code any other pictures in the uncompressed video stream.

6. The method of claim 5, wherein:
   the video compression processing comprises coding pictures as either I, P, or B pictures; and
   step (b) comprises the step of ensuring that each picture in the flash sequence is coded as a B picture.

7. The method of claim 5, wherein step (b) further comprises the step of ensuring that the picture immediately following the flash sequence is coded as an anchor picture.

8. The method of claim 7, wherein the size of a GOP (group of pictures) comprising the flash sequence is extended by one picture for every picture in the flash sequence.

9. The method of claim 7, wherein the size of a GOP comprising the flash sequence remains unchanged.

10. The method of claim 5, wherein step (b) further comprises the step of ensuring that the picture immediately preceding the flash sequence is coded as an anchor picture.

11. The method of claim 10, wherein the size of a GOP comprising the flash sequence is reduced by one picture for every picture in the flash sequence.

12. The method of claim 10, wherein the size of a GOP comprising the flash sequence remains unchanged.

13. The method of claim 1, wherein step (b) comprises the step of adjusting the structure of one or more GOPs associated with the flash sequence.

14. An apparatus for processing an uncompressed video stream, comprising:
   (a) means for detecting a flash sequence in the uncompressed video stream, wherein the flash sequence is a set of one or more consecutive pictures in which:
   (1) a picture preceding the flash sequence is poorly correlated to the flash sequence;
   (2) a picture following the flash sequence is poorly correlated to the flash sequence; and
   (3) the picture preceding the flash sequence is well-correlated to the picture following the flash sequence, wherein means (a) determines that the picture preceding the flash sequence is well-correlated to the picture following the flash sequence; and
   (b) means for adjusting video compression processing based on the detection of the flash sequence to generate part of a compressed video bitstream corresponding to the uncompressed video stream.

15. A computer-readable medium having stored thereon a plurality of instructions, the plurality of instructions including instructions which, when executed by a processor, cause the processor to implement a method for processing an uncompressed video stream, the method comprising the steps of:
   (a) detecting a flash sequence in the uncompressed video stream, wherein the flash sequence is a set of one or more consecutive pictures in which:
   (1) a picture preceding the flash sequence is poorly correlated to the flash sequence;
   (2) a picture following the flash sequence is poorly correlated to the flash sequence; and
   (3) the picture preceding the flash sequence is well-correlated to the picture following the flash sequence, wherein step (a) comprises the step of determining that the picture preceding the flash sequence is well-correlated to the picture following the flash sequence; and
   (b) adjusting video compression processing based on the detection of the flash sequence to generate part of a compressed video bitstream corresponding to the uncompressed video stream.

16. A system for processing an uncompressed video stream, comprising:
   (a) a plurality of delay buffers connected in series;
   (b) a multi-tap switch configured to be positioned to receive picture data from an output of any one of the delay buffers;

(c) a video encoder configured to the switch to receive and code the picture data into a compressed video bitstream corresponding to the uncompressed video stream; and (d) a flash detector configured to detect a flash sequence in the uncompressed video stream, wherein:

the flash sequence is a set of one or more consecutive pictures in which:
  (1) a picture preceding the flash sequence is poorly correlated to the flash sequence;
  (2) a picture following the flash sequence is poorly correlated to the flash sequence; and
  (3) the picture preceding the flash sequence is well-correlated to the picture following the flash sequence;

the flash detector is configured to determine that the picture preceding the flash sequence is well-correlated to the picture following the flash sequence; and the video encoder adjusts video compression processing based on the detection of the flash sequence by the flash detector to generate part of the compressed video bitstream.

17. The system of claim 16, wherein:

the system comprises (N+1) delay buffers connected in series, each having a corresponding output tap, wherein a tap T0 corresponds to the last buffer in the series, a tap T1 corresponds to the second-to-last buffer in the series, . . . , and a tap TN corresponds to the first buffer in the series;

the switch is an (N+1)-position switch configured to be positioned at any of the N+1 taps;

the switch is positioned to tap T0 to code a picture as a non-anchor picture; and the switch is positioned at tap TM to code a picture as an anchor picture, where M is the distance between the immediately previous anchor picture and the current anchor pictures.

18. The system of claim 16, wherein the video encoder adjusts an allocation of bits used to code the flash sequence.

19. The system of claim 18, wherein the video encoder reduces the allocation of bits used to code the flash sequence.

20. The system of claim 16, wherein the flash sequence consists of a single flash picture.

21. The system of claim 16, wherein the video encoder ensures that each picture in the flash sequence is coded as a non-anchor picture that is not used as a reference to code any other pictures in the uncompressed video stream.

22. The system of claim 21, wherein:
  the video compression processing comprises coding pictures as either I, P, or B pictures; and
  the video encoder ensures that each picture in the flash sequence is coded as a B picture.

23. The system of claim 21, wherein the video encoder ensures that the picture immediately preceding the flash sequence is coded as an anchor picture.

24. The system of claim 23, wherein the size of a GOP comprising the flash sequence is reduced by one picture for every picture in the flash sequence.

25. The system of claim 23, wherein the size of a GOP comprising the flash sequence remains unchanged.

26. The system of claim 21, wherein the video encoder ensures that the picture immediately following the flash sequence is coded as an anchor picture.

27. The system of claim 26, wherein the size of a GOP comprising the flash sequence is extended by one picture for every picture in the flash sequence.

28. The system of claim 26, wherein the size of a GOP comprising the flash sequence remains unchanged.

* * * * *